UNITED STATES PATENT OFFICE.

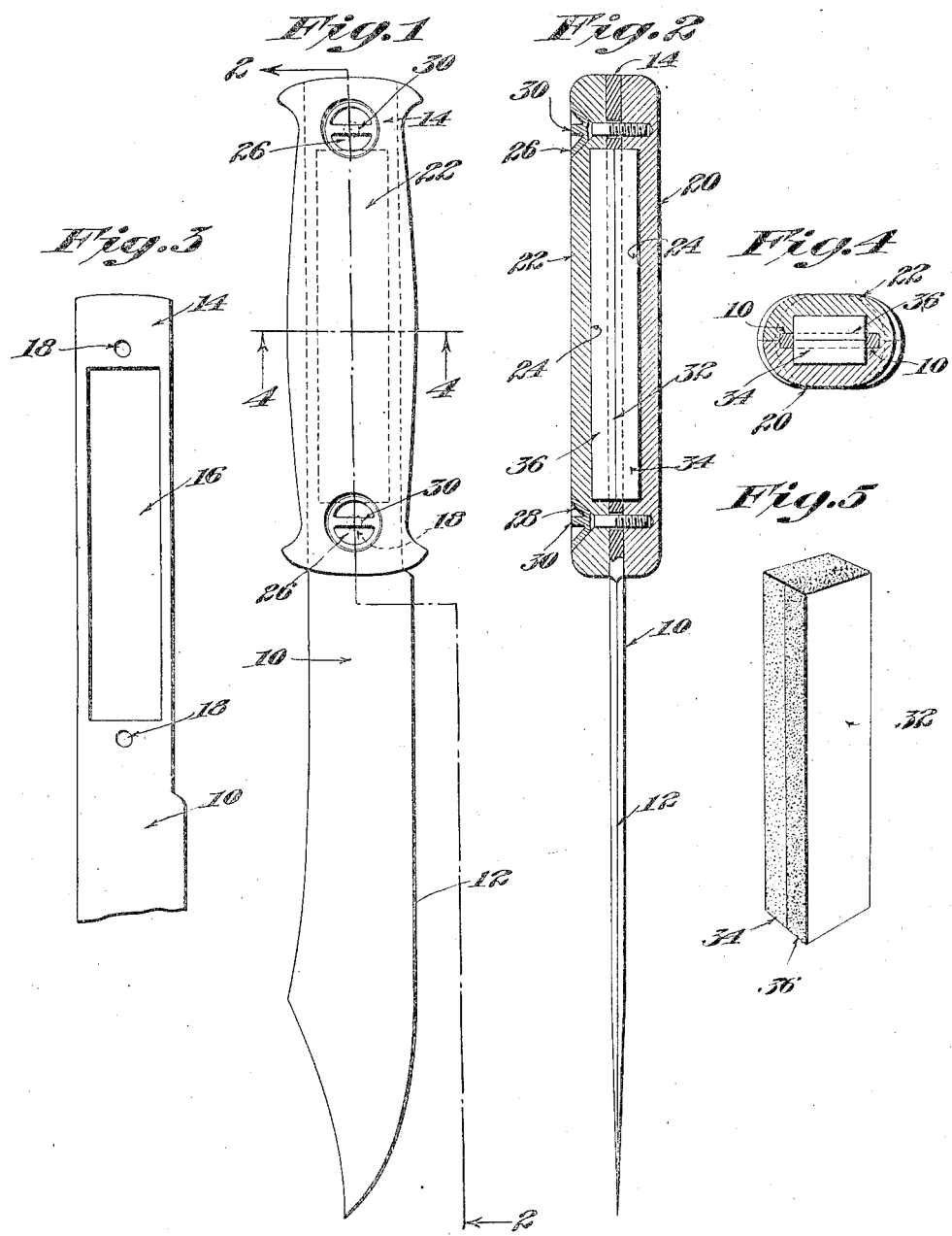

WILLIAM M. STODDER, OF HINGHAM, MASSACHUSETTS.

KNIFE.

1,359,448.  Specification of Letters Patent.  Patented Nov. 16, 1920.

Application filed November 1, 1919. Serial No. 334,995.

*To all whom it may concern:*

Be it known that I, WILLIAM M. STODDER, a citizen of the United States, residing at Hingham, in the county of Plymouth and State of Massachusetts, have invented a new and useful Improvement in Knives, of which the following is a specification, reference being had therein to the accompanying drawings.

My invention relates to knives, and is designed more particularly to knives used in out-of-doors work, hunting, and similar pursuits.

The main object of my invention is to provide a knife having a chambered handle designed to carry a whetstone or other means for sharpening the knife when desired.

Another object of the invention is to provide a handle so constructed as to permit easy and convenient access to the sharpening means whenever desired.

A further object is to provide convenient means which may be employed to support the sharpening means when in use.

Other objects of the invention will be more specifically pointed out and described hereinafter.

Briefly, my invention contemplates a knife having a chambered handle in which may be carried a whetstone adapted for use in sharpening the cutting edge of the knife. Although the handle may be constructed in various forms, the preferable arrangement is in two pieces which are adapted to be secured one to each side of the shank of the knife blade. Each part of the handle is hollowed out and the shank of the knife is provided with a corresponding longitudinal recess so that an inner chamber is provided in the handle of the knife, when the parts are assembled, of sufficient size to hold a whetstone. Any suitable means may be provided for holding the parts in assembled relation, but preferably I prefer to have these means of such form that they may be operated by the fingers without requiring the use of a screw-driver or other implement.

In the drawings illustrating the preferred embodiment of my invention, Figure 1 is a side elevation of a knife constructed in accordance with my invention; Fig. 2 is a view partly in section and partly in elevation on line 2—2 in Fig. 1; Fig. 3 is a side elevation of the shank end of the knife blade; Fig. 4 is a cross-sectional elevation on line 4—4 in Fig. 1; and Fig. 5 is a perspective view of one form of whetstone adapted to be carried in the hollow handle of the knife.

Referring to the drawings, 10 designates a knife blade having a cutting edge 12 and a shank 14. The blade of the knife may be of any suitable form. The shank 14 of the knife is provided with a central longitudinal recess or through and through opening 16 and with holes 18, 18, adapted to receive screws in securing the handle portions to the knife blade.

The handle is made up of two portions of substantially like construction 20, 22, each portion being provided with a recess 24 on its inner side corresponding in outline to the opening 16 in the shank of the knife, the recesses in the two portions of the handle being so located that when the handle portions are assembled on the knife the two recesses form an interior chamber in the knife handle.

Any suitable means may be provided for detachably holding the handle portions upon the shank of the knife, and one such form is shown in the drawings comprising two screws 26 and 28 having heads provided with a central ridge or flange 30 which may be grasped by the finger nails, in the operation of screwing or unscrewing the screws. The handle portion 22 is provided with countersunk recesses to receive the heads of the screws so that when the parts of the knife are assembled the heads of the screws are flush with the outside of the handle.

Within the chamber in the handle may be mounted a whetstone 32 which may be made up of a portion 36 of fine material and a portion 34 of coarser material so as to present a fine sharpening surface on one side and a coarse sharpening surface on the other side.

In the use of my knife all that is required when sharpening becomes necessary is to unscrew the two screws 26 and 28 with the finger nails, thereby allowing the handle portions to separate. The whetstone is then removed from the chamber and the knife blade is grasped by the shank and applied to the whetstone in the usual manner. If desired the whetstone may be held in one portion of the handle which serves as a support for it during the sharpening process, and that portion may be held in the palm of the hand or placed upon a support and held there. The recess in the handle portion will prevent lateral movement of the whetstone as the knife blade is moved over it. It will be observed from the drawings that the whetstone fits snugly the recesses in the various parts of the knife handle including the shank of the blade when the parts are assembled, and for this reason, the whetstone serves to reinforce, to a certain extent, the handle of the knife and the shank of the blade when the same are subjected to strain.

It is to be understood that my invention is not to be limited to the specific form shown and described but may be embodied in other forms of construction all within the purview of the following claims.

What I claim is:—

1. A knife comprising a blade having a cutting portion and a shank portion, said shank portion being provided with a central longitudinal opening, a handle in two pieces of like form, each of said pieces having an interior recess; means for securing said handle pieces one on each side of the shank of said blade and an insert adapted to fit snugly the longitudinal opening in the shank portion of the blade and the recesses in the two handle pieces and serving to reinforce the handle.

2. A knife comprising a blade having a cutting edge and a shank having a central longitudinal through and through recess, a handle in two pieces, each of said pieces having an interior recess in alinement with said recess in the shank of said knife, and means for securing said handle pieces on the shank of said blade.

3. A knife comprising a blade having a cutting portion and a shank portion, said shank portion being provided with a central longitudinal opening, a handle in two pieces of like form, each of said pieces having an interior recess in alinement with the opening in said shank portion, each being mounted on one side of the shank of said blade; means for removably securing said handle pieces on the shank of said blade and an insert adapted to fit snugly the longitudinal opening in the shank portion of the blade and the recesses in the two handle pieces and serving to reinforce the handle.

4. A knife comprising a blade having a cutting portion and a shank portion provided with a central longitudinal through and through recess, and a handle in two pieces, each of said pieces having an interior recess in alinement with said recess in the shank of said blade and being mounted on one side of the shank of said blade, one of said pieces being removable to permit access to said recess.

5. A knife comprising a blade having a cutting portion and a shank portion provided with a central longitudinal through and through rectangular recess, and a handle secured to the shank of said blade, said handle having a central longitudinal recess in alinement with the recess in the shank of said blade, and a portion of said handle being removable to permit access to said recess.

In witness whereof, I hereunto set my hand this twenty-eighth day of October, 1919.

WILLIAM M. STODDER.